United States Patent [19]

Stewart

[11] Patent Number: 5,404,546
[45] Date of Patent: Apr. 4, 1995

[54] BIOS INDEPENDENT POWER MANAGEMENT FOR PORTABLE COMPUTER

[75] Inventor: Gregory N. Stewart, Austin, Tex.

[73] Assignee: Dell USA, Austin, Tex.

[21] Appl. No.: 17,581

[22] Filed: Feb. 16, 1993

Related U.S. Application Data

[63] Continuation of Ser. No. 655,889, Feb. 14, 1991.

[51] Int. Cl.⁶ ............................................. G06F 1/32
[52] U.S. Cl. ................................... 395/750; 364/707; 364/273.1; 364/DIG. 1
[58] Field of Search ................ 395/750, 575, 325; 364/273.1, DIG. 1, 948.8, DIG. 2, 707

[56] References Cited

U.S. PATENT DOCUMENTS

| | | | |
|---|---|---|---|
| 4,293,927 | 10/1981 | Hoshii | 395/750 |
| 4,381,552 | 4/1983 | Nocilini et al. | 364/707 |
| 4,698,748 | 10/1987 | Juzswik et al. | 395/750 |
| 4,851,987 | 7/1989 | Day | 395/550 |
| 4,951,309 | 8/1990 | Gross et al. | 379/98 |
| 4,980,836 | 12/1990 | Carter et al. | 364/483 |
| 5,129,091 | 7/1992 | Yorimoto et al. | 395/750 |
| 5,176,024 | 11/1992 | Smith et al. | 395/375 |

FOREIGN PATENT DOCUMENTS

| | | | |
|---|---|---|---|
| 0459247 | 12/1991 | European Pat. Off. | G06F 1/32 |
| WO9100566 | 1/1991 | WIPO | G06F 1/32 |

Primary Examiner—Jack B. Harvey
Assistant Examiner—Glenn A. Auve
Attorney, Agent, or Firm—David McCombs; James Huffman

[57] ABSTRACT

Method and apparatus for effecting BIOS independent power management of a personal computer system having a processor complex connected via a system bus to at least one I/O device capable of operating in a reduced power consumption state. A power control system comprising a dedicated power management microcontroller monitors the activity of various I/O devices. When a particular device or combination of devices has remained inactive for the preselected time interval, the power control system issues a bus request to a processor complex. When the processor complex acknowledges the bus request, the power control system asserts control as master of the system bus and performs the operations necessary to cause at least one device to enter a reduced power consumption state. The power control system then surrenders control of the bus to the processor complex. In one aspect, a CPU clock controller is utilized to reduce the processing speed of the processor complex CPU.

26 Claims, 2 Drawing Sheets

BIOS INDEPENDENT POWER MANAGEMENT FOR PORTABLE COMPUTER

CROSS REFERENCE TO RELATED APPLICATION

This application is a continuation of copending application Ser. No. 07/655,889, filed Feb. 14, 1991, for PORTABLE COMPUTER WITH BIOS-INDEPENDENT POWER MANAGEMENT, pending.

TECHNICAL FIELD

The invention relates generally to power management systems for personal computers and specifically to the BIOS independent power management of personal computers.

BACKGROUND OF THE INVENTION

Portable personal computers (PCs) were first introduced in the early 1980s and have since enjoyed great commercial success and consumer acceptance. As the portable PC market has grown, users have begun to demand lighter weight, lower volume PCs which can be used for longer periods of time between battery charges. Meeting these demands has proved challenging in view of the fact that most portable PCs now support peripheral devices previously available only on desktop PCs. The additional peripherals greatly increase overall power consumption, making it difficult to achieve an optimal level of functionality while maintaining an acceptable battery life. Furthermore, although for reasons other than maximizing battery life, it has become desirable to more efficiently manage power consumption of desktop PCs in order to minimize overall operating costs.

One solution has been to design power management routines which cause certain I/O and peripheral devices to operate in the lowest possible power consumption state with respect to present demands on the device. For example, when the central processing unit (CPU) is not executing a program, its power consumption can be reduced considerably by decreasing the speed at which it operates. Further examples include turning off the LCD backlight or blanking the monitor screen after a period of keyboard inactivity and stopping the harddisk drive motor after the drive has not been accessed for a preset interval of time.

In general, power management systems use interrupts to communicate to the central processing unit (CPU) of the PC that certain I/O devices should be powered down. The control logic necessary to implement the power management functions is accessed through the ROM basic input/output system (BIOS) software. For example, U.S. Pat. No. 4,980,836 to Carter discloses a power management system in which the activity of certain I/O devices is monitored and timers associated each device are reset each time the corresponding device is accessed. When a device has remained inactive for a predetermined interval of time, a non-maskable interrupt (NMI) is sent by power management circuitry to the CPU. Upon receiving the NMI, the CPU stops processing and executes the interrupt service code, i.e. places the device in its low power consumption state. The CPU then resumes processing from the point at which the interrupt occurred.

While the Carter system is functional in a DOS environment, it is not compatible and will not operate with protected mode operating systems and applications, such as Microsoft Windows, Unix and OS/2. Carter stores its power management control logic in ROM-BIOS, which is inherently limited to a 16-bit "real mode" operation and cannot operate in the 32-bit "protected mode" available with the Intel 80286 and more advanced 80X86 microprocessors. Protected mode operating systems and applications bypass the ROM-BIOS software, substituting their own BIOS therefor. As a result, hardware specific power management functions that are inserted into ROM-BIOS are lost when protected mode operating systems and applications are implemented.

Further, and perhaps more importantly, while a NMI is not problematic within a DOS environment, in a Windows environment, a NMI signals a fatal parity error, causing further input and output to be inhibited. For this mason, the power management system of Carter and those similar to it must be disabled prior to executing protected mode programs. Clearly, this result is unsatisfactory, especially in view of the growing popularity of Windows and Windows-based applications.

Other power management systems have been developed which are compatible with Windows and other protected mode programs. These systems use an interrupt other than a NMI, such as interrupt 15H (INT 15H). These systems are also deficient in that the use of INT 15H is not exclusive, making it impossible to determine whether the interrupt code which is ultimately executed is that of the power management system or of another applications program. Moreover, special device drivers and interrupt service code specific to the particular hardware and operating system version must be inserted into the program in order to implement power management functions. As a result, these systems must be designed specifically for and may be implemented only with a particular combination of hardware and operating system software.

Another attempt at making power management systems compatible with protected mode programs has involved the use of microprocessors that support a system management interrupt (SMI). An example of such a processor includes the Intel SL. A SMI, unlike a NMI, is operable in protected mode because it does not map with the operating system. When the CPU receives a SMI, it saves a large number of internal registers, executes thousands of lines of code, and then restores the registers. As a result, using a SMI to implement power management will prove to be prohibitively slow with respect to certain CPU activities. For example, if the CPU receives a SMI while performing a serial I/O transfer, some data will be lost during the time it takes the CPU to save its state, service the interrupt and resume processing. To avoid this result, the power management functions must be disabled whenever a serial transfer or other time critical operation is to be performed.

SUMMARY OF THE INVENTION

The foregoing problems are solved and a technical advance is achieved by method and apparatus for BIOS independent power management of a desktop or portable personal computer (PC). In a departure from the art, the monitoring and power management functions are implemented by a power control system, which comprises a dedicated power management microcontroller, rather than by the CPU. As a result, power management is performed transparently to the CPU.

In an illustrative embodiment, the apparatus comprises a power control system, a processing complex, and various I/O devices capable of operating in a reduced power consumption state interconnected via a system bus. The power control system monitors the activity of the various I/O devices and resets a timer associated with the device or combination of devices upon each access of the device or devices. If upon the elapse of a predetermined time interval a particular device or combination of devices has not been accessed, as indicated by the expiration of the associated timer, the power control system issues a bus request (BREQ) signal to the processor complex. Once the processor complex acknowledges the BREQ with a bus request acknowledge (BACK) signal to the power control system, the power control system asserts control as master of the system bus and performs the operations necessary to place the appropriate device or devices in a reduced power consumption state. The power control system then surrenders control of the bus to the processor complex.

The power control system continues to monitor the devices and upon the first occurrence of I/O activity subsequent to a device or devices being placed in a reduced power consumption state, the control system reasserts control as master of the bus in the manner described above and causes the device or devices to return to a full power consumption state.

While the power control system is master of the bus, CPU operation is halted to allow the control system to perform the necessary power control functions. Because no interrupt servicing is necessary in order for these functions to be performed, the CPU is able to resume execution from the point at which it was previously halted immediately upon regaining control of the bus. As a result, performance of the power management functions is completely transparent to the CPU.

In one aspect of the invention, a CPU clock controller is also connected to the system bus. Upon the elapse of a predetermined period of I/O inactivity, the power control system becomes master of the system bus, as previously described, and writes directly to the CPU clock controller to reduce the processing speed of the CPU to either 3.125 Megahertz (MHz), 2.0 MHz, 0 MHz or another value, depending upon the particular implementation of the CPU. Again, upon the first occurrence of I/O activity following the reduction of CPU speed, the power control system reasserts control as master of the bus and causes the CPU to resume processing at full speed.

In another aspect of the invention, a user is able to specify certain parameters of the power control system via a system set up application. During system set up, the user is prompted to specify particular "time-outs" to be used in setting the timers associated with particular devices or combinations thereof. Further, a function is provided which, when enabled, will cause the processing speed of the CPU to be reduced after a predetermined period of I/O inactivity, as previously described.

A technical advantage achieved with the invention is that the performance of the power management functions is transparent to the CPU and programs being executed thereby.

Another technical advantage achieved with the invention is that it is operational with protected mode operating systems and applications.

A further technical advantage achieved with the invention is that it does not require special drivers and interrupt service code specific to the hardware and version of the operating system to be inserted into the operating system software.

Still a further technical advantage achieved with the invention is that the power management functions are performed with sufficient speed so as not to interfere with serial input/output (I/O) transfers and other time critical CPU operations.

DETAILED DESCRIPTION OF THE PREFERRED EMBODIMENT

Figure 1:
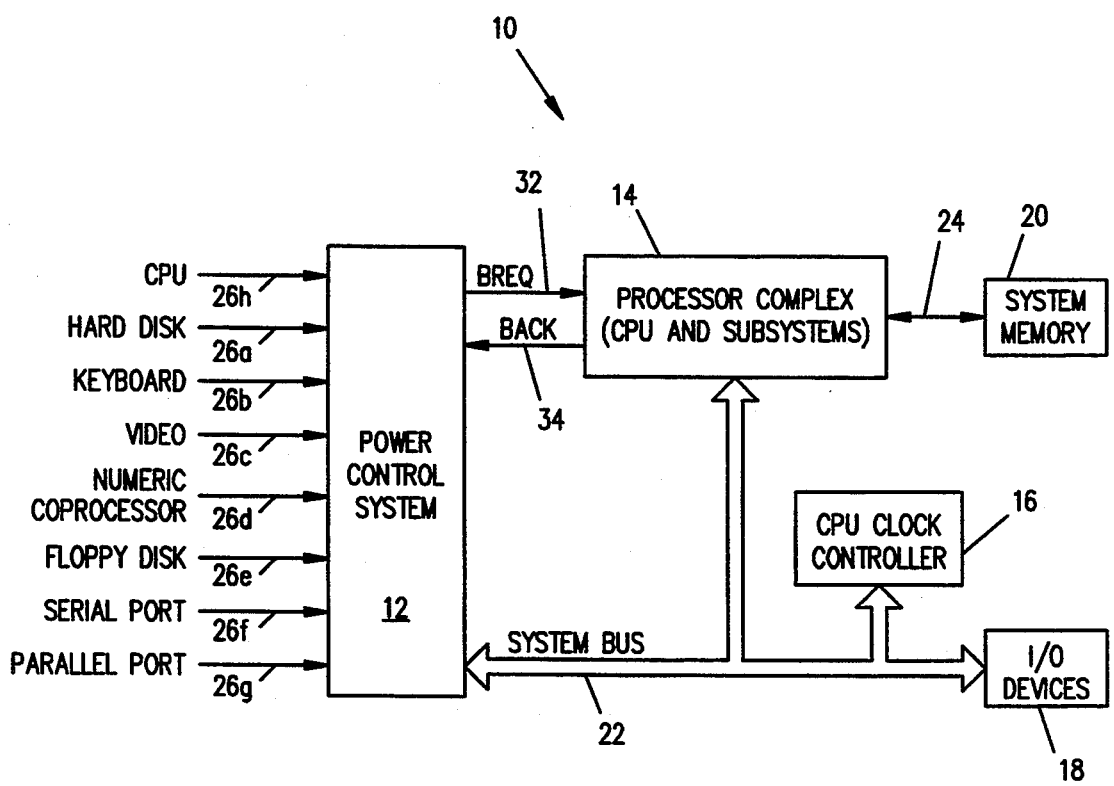
FIG. 1 is a functional block diagram of a personal computer embodying features of the power management control system of the present invention.

In FIG. 1, the reference numeral 10 designates a personal computer system embodying features of the present invention. The system 10 comprises a power control system 12, a processor complex 14, a CPU clock controller 16, several I/O devices 18, and a system memory 20. A system bus 22 interconnects the power control system 12, processor complex 14, CPU clock controller 16 and I/O devices 18. While not shown, it is understood the processor complex 14 includes a CPU and associated subsystems normally required for operation of a personal computer. For example, portions of the complex 14 may include a commercially available single chip solution or "chip set." A bus 24 connects the system memory 20 to the complex 14.

Although not shown, it is understood that the I/O devices 18 may include hard disk drives, floppy disk drives, a keyboard, a video monitor, a mouse, a numeric coprocessor, various serial and parallel ports, and other similar I/O or peripheral devices used in connection with a personal computer. Since these devices are well known, they will not be described further.

The power control system 12 is a microprocessor system which includes CPU, memory and I/O components (not shown). The system 12 monitors the activity of the I/O devices 18 via lines 26a-26g, connected with conventional circuitry (not shown) to the the I/O devices. The lines 26a-26g are connected to exemplary hard disk, keyboard, video, numeric coprocessor, floppy disk, serial port and parallel port I/O devices 18, respectively. The system 12 monitors the status of the CPU (not shown) of the processor complex 14 via line 26h. It is understood that the signals on lines 26a-26h used for the monitoring functions are dependent upon the types of I/O devices used and the particular computer implementation. For example, in an IBM PC implementation of the processor complex 14, certain I/O devices generate interrupt signals to the CPU when accessed. The interrupt signals are thus also indicated on the particular line 26a-26g to the power control system 12. Other I/O devices may generate chip select signals, for example, which are detected on the appropriate line 26a-26g and input to the control system 12 in the above-described manner.

As will be described, a user may specify timeout parameters upon which a plurality of software timers, each specific to a particular I/O device or logical combination thereof, are based. In the event that a parameter is not specified, a default parameter is used. If upon polling a line 26a–26h the power control system 12 determines that the CPU or a particular device 18 is active, the corresponding timer is reset.

After a device has remained inactive for the predetermined interval of time, as indicated by the expiration of the corresponding timer, the control system 12 performs the functions necessary to place the CPU or particular I/O device or combination of devices in a reduced power consumption state. The system 12 gains control of the system bus 22 and then communicates with the particular I/O device 18 to place it in the reduced power consumption state, independent of the CPU of the processor complex 14. The system 12 gains control of the system bus 22 by issuing a bus request (BREQ) signal to the processor complex 14 via a line 32. The complex 14 acknowledges the BREQ signal with a bus acknowledge (BACK) signal via a line 34, to grant control of the bus 22 to the system 12. Upon receipt of the BACK signal, the control system 12 becomes the bus master for one clock cycle. The remaining devices competing for the use of the system bus 22 are slaves until the system 12 relinquishes control of bus. While not shown, it is understood that for an IBM PC AT implementation, the control system 12 becomes the bus master by using the MASTER control line.

It is understood that the operations to be performed by the system 12 while it is the bus master to power down the particular I/O devices 18 will depend upon the nature of the devices. For example, if the I/O device 18 is a hard disk drive, the control system 12 will write directly to the appropriate I/O port of the system 10 and set a bit, resulting in the hard disk drive's motor turning off. The motor will automatically turn on upon the next attempt at a hard disk drive access. If the device to be powered down is the CPU, the control system 12 will write to the CPU clock controller 16 to either slow or halt the CPU clock, again depending upon the particular implementation of the CPU.

Figure 2:
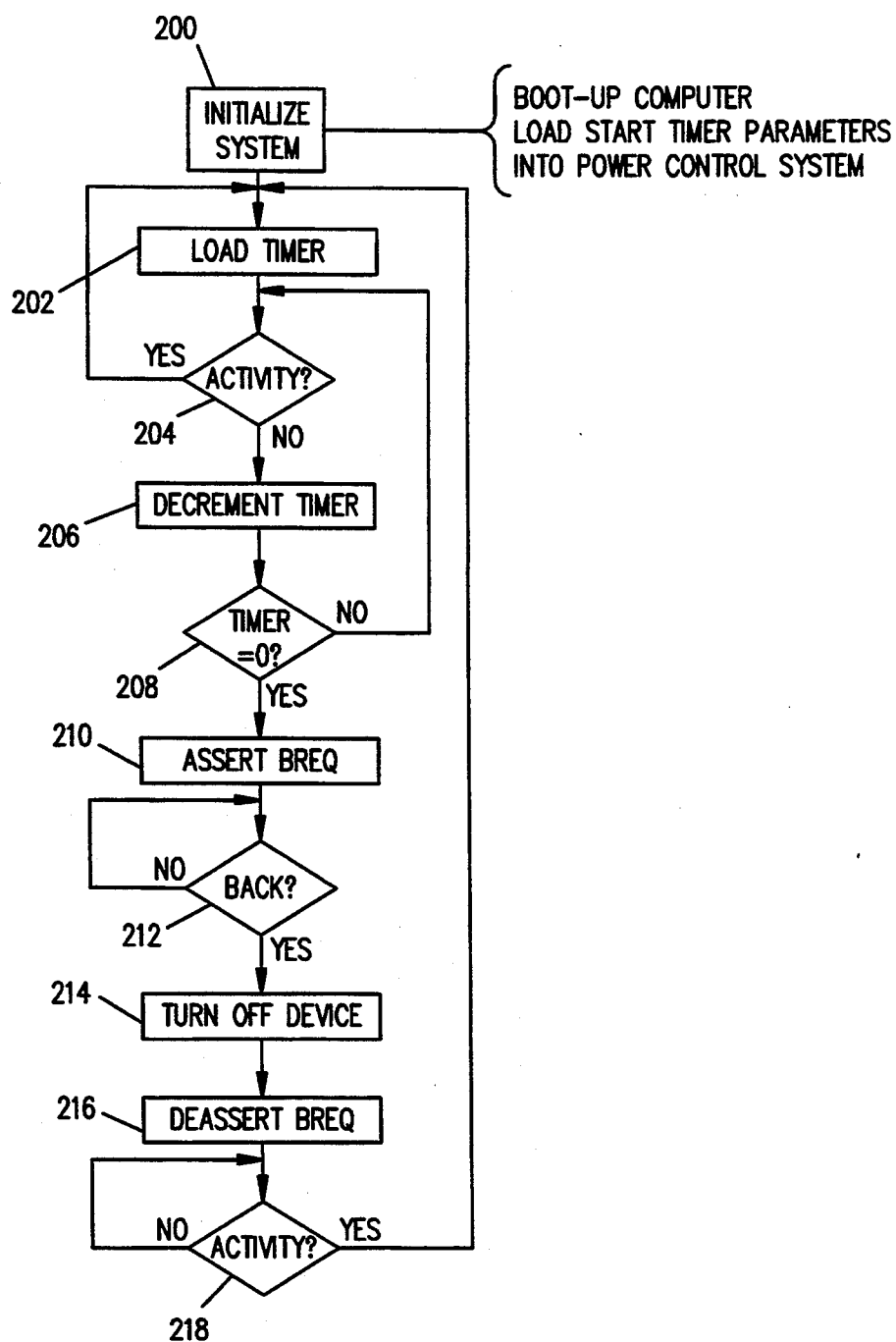
FIG. 2 is a flowchart of the logic implemented in the power management control system of FIG. 1.

FIG. 2 is a flowchart illustrating control logic implemented by the power control system 12 in accordance with the present invention. The control logic may be implemented by microcode instructions stored within the system 12. The flow chart exemplifies control logic further illustrated in the attached appendix. The control logic describes power consumption reduction operations for one I/O device 18, it being understood that other devices are also controlled by similar logic. Further, it is noted that one or more devices 18 may be placed in a reduced power consumption state based on the activity of that device, a different device or combination of devices.

Execution begins in step 200 with the performance of initialization procedures. In step 202 a timer associated with the I/O device 18 is loaded in the system 12. It is understood that a user is able to specify the time-out parameters for the timer. Default parameters are provided if the parameters are not specified by the user. When the timer is loaded in step 202, with either specified or default parameters, it is initialized to the time-out value. At step 204, the power control system 12 monitors the device 18 (or combination of devices) associated with the timer to determine whether the device is active. As indicated previously with reference to FIG. 1, activity of a device 18 is indicated by signals on the particular line 26a–26g or on line 26h for the CPU. If at step 204 the device 18 is active, execution returns to step 202 and the timer is reset. Otherwise, execution proceeds to step 206.

At step 206, the timer is decremented. At step 208, a determination is made whether the timer has expired, by decrementing to zero. If at step 208 the timer has not expired, execution returns to step 204. Otherwise, execution proceeds to step 210. At step 210, the power control system 12 issues a BREQ signal to the processor complex 14. At step 212, a determination is made whether the processor complex 14 has acknowledged the BREQ signal by issuing a BACK signal to the power control system 12. If a BACK signal is not received, execution remains at step 212 until received. Execution proceeds to step 214.

At step 214, the power control system 12 asserts control of the system bus 22 and becomes the bus master. The control system 12 then communicates on the system bus 22 with the device 18 to place it in the reduced power consumption state. At step 216, the BREQ is reasserted and the power control system 12 surrenders control of the system bus 22 to the processor complex 14. At step 218, a determination is made whether the device 18 is active. If not, execution remains at step 218 until activity is detected. Otherwise, execution returns to step 202 and the timer is reset.

In one preferred embodiment, the program control system 12 includes several user-programmable timers for managing the power consumption characteristics of the CPU and I/O devices 18. The timers include a "Standby" timer, an "Auto-Suspend" timer, a "Hard-Disk" timer and an "LCD" timer. Also included is a "Smart CPU" mode, which will be subsequently described in detail.

The Standby timer is used to specify the maximum length of time which may elapse between successive occurrences of I/O activity before the system 10 will be placed in a Standby mode, wherein the CPU and several I/O devices 18a are caused to operate in a reduced power consumption state. Specifically, the backlight of the LCD (not shown) is extinguished, the hard-disk drive motor (also not shown) is halted and the CPU clock controller 16 is slowed to a speed of 0 megahertz (MHz). With this timer set, the system 12 monitors I/O activity and resets the timer upon detection of any I/O activity. For example, I/O activity that would cause a resetting of the timer would include accessing a hard drive, using a keyboard, modem, serial port or parallel port. A suggested user setting for the Standby timer is within a range of 10 to 15 minutes, although other settings may be chosen. Upon the occurrence of any I/O activity, the system 10 automatically exits Standby mode and is returns to its previous full power mode.

The Auto-Suspend timer is used to specify the maximum length of time which may elapse between successive occurrences of I/O activity before the system 10 will be placed in a Suspend mode. The Suspend mode causes a more extensive reduction in power consumption with respect to the CPU and several I/O devices 18. In addition to deactivating the I/O devices 18 mentioned above, the system 12 also deactivates microcontroller cache memory, keyboard, any mouse and numeric coprocessor devices, and various system clocks. In Suspend mode, the system 10 consumes only enough power to maintain data stored in the system memory 20. The Auto-Suspend timer is reset upon any I/O activity, as discussed above. A suggested user setting for the Auto-Suspend timer is within a range of 20 to 30 minutes, although other settings may be chosen. Upon the occurrence of any I/O activity, the system 10 automatically exits Suspend mode and returns to its previous full power mode.

The Hard-Disk timer is used to specify how much time may elapse between successive hard disk accesses before the hard disk drive motor is halted. A suggested user setting for the Hard-Disk timer is within a range of 1 to 15 minutes, although other settings may be chosen. Once halted, the hard disk is reactivated automatically upon the next hard disk access attempt.

The LCD timer is used to specify how much time may elapse between periods of I/O activity before the LCD backlight is extinguished. A suggested user setting for the LCD timer is within a range of 1 to 15 minutes, although other settings may be chosen. Once extinguished, the LCD backlight automatically returns to its full power state upon any I/O activity.

The Smart-CPU function is used to reduce the power consumption of the CPU of the processor complex 14 and may be enabled or disabled by a user when setting the above timer values. Upon elapse of the Smart-CPU timer the CPU clock controller 16 is slowed to a reduced speed, such as approximately 3.125 MHz, 2.0 MHz or another value. With this timer set, the system 12 monitors I/O activity and resets the timer upon detection of any I/O activity. The Smart-CPU timer is set for a relatively short interval of time, for example, 12 seconds. The reduced speed mode is useful for conserving power when the CPU is not performing demanding processing functions.

It is understood that the present invention can take many forms and embodiments. The embodiments shown herein are intended to illustrate rather than to limit the invention, it being appreciated that variations may be made without departing from the spirit of the scope of the invention. For example, the processor complex 14 may be implemented using any commercially available CPU and associated subsystems, including PC-compatible, RISC-based, Macintosh or other systems. Furthermore, the power control system 12 may be configured to monitor I/O and peripheral devices other than those discussed herein, expansion cards and other components used in association with personal computers.

Although illustrative embodiments of the invention have been shown and described, a wide range of modification, change and substitution is intended in the foregoing disclosure and in some instances some features of the present invention may be employed without a corresponding use of the other features. Accordingly, it is appropriate that the appended claims be construed broadly and in a manner consistent with the scope of the invention.

What is claimed is:

1. A method for controlling power consumption of a personal computer system, the system including a processor complex and input/output (I/O) devices each capable of operating in a reduced power consumption state, said complex and said devices being interconnected by a system bus, the method comprising:
   monitoring, by a power control system, said computer system for I/O activity associated with at least one said device;
   setting a timer for a predetermined interval;
   resetting said timer to said predetermined interval upon detecting said I/O activity responsive to said monitoring;
   said power control system issuing a bus request signal to said complex upon elapse of said predetermined interval for gaining control of said bus as master independent of said complex; and
   said power control system generating signals as master of said bus independent of said complex to said at least one device for placing said at least one device in said reduced power consumption state.

2. The method of claim 1 further comprising:
   said power control system deasserting said bus request signal to said complex for releasing control of said bus as master upon completion of said signal generation.

3. The method of claim 1 further comprising:
   monitoring said computer system for I/O activity when said at least one device is operating in said reduced power consumption state;
   said power control system issuing a bus request signal to said complex to gain control of said bus as master when said I/O activity is detected in response to said reduced power consumption state monitoring; and
   said power control system generating signals on said bus as master independent of said complex to said at least one device for removing said at least one device from said reduced power consumption state.

4. The method of claim 3 further comprising:
   said power control system deasserting said bus request signal to said complex for releasing control of said bus as master upon completion of said removal signal generation.

5. The method of claim 1 wherein said processor complex includes a central processing unit (CPU) and a CPU clock controller connected to said bus, the method further comprising said power control system generating signals on said system bus as master independent of said complex to said CPU clock controller for reducing the processing speed of said CPU.

6. The method of claim 5 wherein said CPU processing speed is reduced to 0 megahertz.

7. The method of claim 5 wherein said CPU processing speed is reduced to 3.125 megahertz.

8. The method of claim 1 wherein said predetermined interval is a default interval for each said at least one device.

9. The method of claim 1 wherein said predetermined interval is a user selected interval for each said at least one device.

10. The method of claim 1 wherein said at least one device comprises a display having a back light and a hard disk having a drive motor, the signal generating step further comprising:
    generating signals for turning off said display back light; and
    generating signals for turning off said drive motor.

11. A method for controlling power consumption of a personal computer system, the computer system including a processor complex having a central processing unit (CPU), a CPU clock controller and input/output (I/O) devices each capable of operating in a reduced power consumption state, said complex, said controller and said devices being interconnected by a system bus, the method comprising:
    monitoring, by a power control system, said computer system for I/O activity associated with at least one said device;
    setting a timer for a predetermined interval;

resetting said timer to said predetermined interval upon detecting said I/O activity responsive to said monitoring;

said power control system issuing a bus request signal to said complex upon elapse of said predetermined interval for gaining control of said bus as master independent of said complex;

said power control system generating signals on said bus as master independent of said complex to said at least one device for placing said at least one device in said reduced power consumption state;

said power control system generating signals on said bus as master independent of said complex to said CPU clock controller for reducing the processing speed of said CPU;

said power control system deasserting said bus request signal to said complex for releasing control of said bus as master upon completion of said signal generation;

said power control system monitoring said computer system for I/O activity when said at least one device is in said reduced power consumption state;

said power control system issuing a bus request signal to said complex to gain control of said bus as master when said I/O activity is detected in response to said reduced power consumption state monitoring;

said power control system generating signals on said bus as master independent of said complex to said controller and said at least one device for removing said CPU from said reduced speed and for removing said at least one device from said reduced power consumption state; and said power control system deasserting said bus request signal to said complex for releasing control of said bus as master upon completion of said removal signal generation.

12. A microcontroller connected to a system bus of a personal computer system, said microcontroller for managing power consumption of the system, the system including on said system bus a processor complex and input/output (I/O) devices each capable of operating in a reduced power consumption state, the microcontroller comprising:

at least one signal line connected to at least one said device for receiving signals indicative of I/O activity of said at least one device;

at least one control line connected to said complex for granting and relinquishing said microcontroller control of said system bus as master;

logic for monitoring said at least one signal line for said signals indicative of said I/O activity;

logic for setting a timer for a predetermined interval;

logic for resetting said timer for said predetermined interval in the presence of said I/O activity responsive to said monitoring;

logic for issuing a bus request signal on said at least one control line to said complex upon elapse of said interval to gain control of said bus as a master independent of said complex;

logic for generating signals on said bus as master independent of said complex to said at least one device for placing said at least one device in said reduced power consumption state; and logic for deasserting said bus request signal on said at least one control line to said complex for releasing control of said bus as master upon completion of said signal generation.

13. The microcontroller of claim 12 wherein said processor complex includes a central processing unit (CPU), said microcontroller further comprising:

a CPU clock controller connected to said system bus;

logic for generating signals on said system bus as master independent of said complex to said CPU clock controller for reducing the processing speed of said CPU.

14. The microcontroller of claim 13 wherein said CPU processing speed is reduced to 0 megahertz.

15. The microcontroller of claim 13 wherein said CPU processing speed is reduced to 3.125 megahertz.

16. The microcontroller of claim 12 wherein said predetermined value is a default value.

17. The microcontroller of claim 12 wherein said predetermined interval is a user selected interval for each said at least one device.

18. The microcontroller of claim 12 further comprising:

logic for monitoring said at least one signal line for said signals indicative of said I/O activity when said at least one device is in said reduced power consumption state;

logic for issuing a bus request signal on said at least one control line to said complex to gain control of said bus as master when said I/O activity is detected in response to said reduced power consumption state monitoring;

logic for generating signals on said bus as master independent of said complex to said at least one device for removing said at least one device from said reduced power consumption state; and logic for reasserting said bus request signal to said complex for releasing control of said bus as master upon completion of said removal signal generation.

19. A microcontroller connected to a system bus of a personal computer system, said microcontroller for managing power consumption of the system, the system including on said system bus a processor complex and input/output (I/O) devices each capable of operating in a reduced power consumption state, the microcontroller comprising:

at least one signal line connected to at least one of said devices for receiving signals indicative of I/O activity of said at least one device;

at least one control line connected to said complex for granting and relinquishing said microcontroller control of said system bus as master;

logic for monitoring said at least one signal line for said signals indicative of said I/O activity;

logic for setting a timer for a predetermined interval;

logic for resetting said timer for said predetermined interval in the presence of said I/O activity responsive to said monitoring;

logic for issuing a bus request signal on said at least one control line to said complex upon elapse of said interval to gain control of said bus as a master independent of said complex;

logic for generating signals on said bus as master independent of said complex to said at least one device for placing said at least one device in said reduced power consumption state;

logic for deasserting said bus request signal on said at least one control line to said complex for releasing control of said bus as master upon completion of said signal generation;

logic for monitoring said at least one signal line for said signals indicative of said I/O activity when said at least one device is in said reduced power consumption state;

logic for issuing a bus request signal on said at least one control line to said complex to gain control of said bus as master when said I/O activity is detected in response to said reduced power consumption state monitoring;

logic for generating signals on said bus as master independent of said complex to said at least one device for removing said at least one device from said reduced power consumption state; and logic for deasserting said bus request signal to said complex for releasing control of said bus as master upon completion of said removal signal generation.

20. The microcontroller of claim 19 wherein said processor complex includes a central processing unit (CPU), said microcontroller further comprising:

a CPU clock controller connected to said system bus;

logic for generating signals on said system bus as master independent of said complex to said CPU clock controller for reducing the processing speed of said CPU.

21. The microcontroller of claim 20 wherein said CPU processing speed is reduced to 0 megahertz.

22. The microcontroller of claim 20 wherein said CPU processing speed is reduced to 3.125 megahertz.

23. The microcontroller of claim 19 wherein said predetermined value is a default value.

24. The microcontroller of claim 19 wherein said predetermined interval is a user selected interval for each said at least one device.

25. A method for controlling power consumption of a personal computer system, the system including a processor complex and input/output (I/O) devices capable of operating in a reduced power consumption state, said complex and said devices being interconnected by a system bus, the method comprising:

monitoring, by a power control system, said computer system for I/O activity associated with at least one said device;

setting a timer for a predetermined interval according to a user selected interval for said at least one device;

resetting said timer to said predetermined interval upon detecting said I/O activity responsive to said monitoring;

said power control system issuing a bus request signal to said complex upon elapse of said predetermined interval for gaining control of said bus as master independent of said complex; and said power control system generating signals as master of said bus independent of said complex to said at least one device for placing said at least one device in said reduced power consumption state.

26. The method of claim 25 wherein said at least one device comprises a display having a back light and a hard disk having a drive motor, the signal generating step further comprising:

generating signals for turning off said display back light; and generating signals for turning off said drive motor.

* * * * *